(12) United States Patent
Hancock et al.

(10) Patent No.: US 11,171,956 B2
(45) Date of Patent: Nov. 9, 2021

(54) SYSTEMS AND METHODS FOR INITIATING NETWORK ACCESS ACCORDING TO AUTOMATIC AUTHENTICATION UTILIZING A MOBILE DEVICE

(71) Applicant: AT&T Intellectual Property I, L.P., Atlanta, GA (US)

(72) Inventors: Paul R. Hancock, Tower Lakes, IL (US); Stuart Steele, Austin, TX (US); Charles Scott, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 308 days.

(21) Appl. No.: 16/263,612

(22) Filed: Jan. 31, 2019

(65) Prior Publication Data

US 2020/0252399 A1 Aug. 6, 2020

(51) Int. Cl.
*H04L 29/06* (2006.01)
*H04L 12/66* (2006.01)

(52) U.S. Cl.
CPC ........ *H04L 63/0884* (2013.01); *H04L 63/029* (2013.01); *H04L 63/083* (2013.01); *H04L 63/0823* (2013.01); *H04L 63/0876* (2013.01); *H04L 12/66* (2013.01)

(58) Field of Classification Search
CPC ............. H04L 63/0884; H04L 63/0823; H04L 63/0876; H04L 63/029; H04L 63/083; H04L 12/66
USPC .......................................................... 726/2
See application file for complete search history.

(56) References Cited

U.S. PATENT DOCUMENTS

| 8,793,776 | B1* | 7/2014 | Jackson | H04L 63/0853 |
| | | | | 726/7 |
| 8,825,085 | B1 | 9/2014 | Boyle et al. | |
| 9,003,488 | B2 | 4/2015 | Spencer et al. | |
| 9,066,227 | B2 | 7/2015 | Spencer et al. | |
| 9,092,610 | B2 | 7/2015 | Sheu et al. | |
| 9,125,059 | B2 | 9/2015 | Hansmann et al. | |
| 9,264,435 | B2 | 2/2016 | Liu et al. | |

(Continued)

FOREIGN PATENT DOCUMENTS

| EP | 2706763 A1 | 3/2014 |
| WO | 2017061641 A1 | 4/2017 |
| WO | 2017214818 A1 | 12/2017 |

*Primary Examiner* — Bryan F Wright
(74) *Attorney, Agent, or Firm* — Guntin & Gust, PLC; Ralph Trementozzi

(57) ABSTRACT

In one embodiment, a method includes receiving, by an authentication server, first credentials from a mobile application installed on a device. The first credentials include information associated with the device and information associated with a user of the device. The method also includes automatically receiving, by the authentication server and from the device, a request to connect the device to a network of a third party. The request is automatically generated by the device without interaction from the user of the device and the request comprises second credentials. The method further includes determining, by the authentication server, whether to authenticate the device using the first credentials and the second credentials and communicating, by the authentication server, a packet to the device that allows the device to connect to the network of the third party if the authentication server determines to authenticate the device.

20 Claims, 7 Drawing Sheets

(56) References Cited

U.S. PATENT DOCUMENTS

| | | |
|---|---|---|
| 9,544,838 B2 | 1/2017 | Shamis et al. |
| 9,590,884 B2 | 3/2017 | Toksvig et al. |
| 9,619,644 B2 | 4/2017 | Toksvig et al. |
| 9,667,631 B2 | 5/2017 | Rybak et al. |
| 9,686,404 B1 * | 6/2017 | Pan .................. H04M 3/42391 |
| 9,853,968 B2 | 12/2017 | Shen et al. |
| 9,882,955 B2 | 1/2018 | Jamtgaard et al. |
| 10,002,357 B2 | 6/2018 | Canpolat et al. |
| 2012/0047011 A1 | 2/2012 | Rippetoe et al. |
| 2014/0355592 A1 | 12/2014 | Camps et al. |
| 2015/0223059 A1 | 8/2015 | Canpolat et al. |
| 2015/0302483 A1 | 10/2015 | Wilson, V |
| 2016/0037337 A1 * | 2/2016 | Elliott ................... H04L 63/105 713/168 |
| 2017/0317981 A1 * | 11/2017 | Klein .................. H04W 12/041 |
| 2017/0359344 A1 * | 12/2017 | Kaal ................... H04W 12/062 |
| 2019/0014096 A1 * | 1/2019 | Hancock ............. H04L 63/0478 |
| 2019/0380033 A1 * | 12/2019 | Wu ....................... H04L 9/0841 |

\* cited by examiner

| ACTUAL CREDENTIALS 610 || DEVICE 122 | SHADOW CREDENTIALS 620 |||
|---|---|---|---|---|---|
| USERNAME 614 | PASSWORD 616 | | USER IDENTIFICATION 622 | DEVICE IDENTIFICATION 624 | USERNAME 626 | PASSWORD 628 |
| FLINTSTONE | FRED | PHONE | JETSON | GEORGE | GEORGEJETSON | SPACELY |
| | | TABLET | JETSON | JUDY | JUDYJETSON | ASTRO |
| | | LAPTOP | JETSON | ELROY | ELROYJETSON | SLATE |
| RUBBLE | BARNEY | PHONE 1 | MUNSTER | HERMAN | HERMANMUNSTER | GRANDPA |
| | | PHONE 2 | MUNSTER | LILY | LILYMUNSTER | MARILYN |

TABLE 600

*FIG. 6*

SYSTEMS AND METHODS FOR INITIATING NETWORK ACCESS ACCORDING TO AUTOMATIC AUTHENTICATION UTILIZING A MOBILE DEVICE

TECHNICAL FIELD

This disclosure generally relates to automatic authentication, and more specifically to systems and methods for automatically authenticating a user to a network.

BACKGROUND

Captive portals may be used to authenticate a user to a network. Captive portals provide two essential benefits. First, they acquire user permission and agreement to terms and conditions. Second, they provide a branding opportunity for a third-party owner/operator. Traditionally, a user is prevented from accessing the third-party's network until the captive portal process is completed, which may lead to a confusing and undesirable experience for the user.

SUMMARY

According to an embodiment, a method includes receiving, by an authentication server, first credentials from a mobile application installed on a device. The first credentials include information associated with the device and information associated with a user of the device. The method also includes automatically receiving, by the authentication server and from the device, a request to connect the device to a network of a third party. The request is automatically generated by the device without interaction from the user of the device and the request comprises second credentials. The method further includes determining, by the authentication server, whether to authenticate the device using the first credentials and the second credentials and communicating, by the authentication server, a packet to the device that allows the device to connect to the network of the third party if the authentication server determines to authenticate the device.

According to another embodiment, a system includes one or more processors and a memory storing instructions that, when executed by the one or more processors, cause the one or more processors to perform operations including receiving, by an authentication server, first credentials from a mobile application installed on a device. The first credentials include information associated with the device and information associated with a user of the device. The operations also include automatically receiving, by the authentication server and from the device, a request to connect the device to a network of a third party. The request is automatically generated by the device without interaction from the user of the device and the request comprises second credentials. The operations further include determining, by the authentication server, whether to authenticate the device using the first credentials and the second credentials and communicating, by the authentication server, a packet to the device that allows the device to connect to the network of the third party if the authentication server determines to authenticate the device.

According to yet another embodiment, one or more computer-readable storage media embody instructions that, when executed by a processor, cause the processor to perform operations including receiving, by an authentication server, first credentials from a mobile application installed on a device. The first credentials include information associated with the device and information associated with a user of the device. The method also includes automatically receiving, by the authentication server and from the device, a request to connect the device to a network of a third party. The request is automatically generated by the device without interaction from the user of the device and the request comprises second credentials. The method further includes determining, by the authentication server, whether to authenticate the device using the first credentials and the second credentials and communicating, by the authentication server, a packet to the device that allows the device to connect to the network of the third party if the authentication server determines to authenticate the device.

This disclosure may provide one or more of the following technical advantages. Certain embodiments use credentials from third-party applications to automatically authenticate a user to a third-party's network upon the user's arrival at a third-party location without the user interacting with a third-party application, which provides a seamless connection experience for the user. In certain embodiments, the third-party credentials are never exposed to the authentication provider providing the automatic authentication services, which protects the privacy of the user. Authentication information may be communicated to the third party, allowing the third party to passively provide branding opportunities to the user.

One or more embodiments integrate terms and conditions associated with the use of a third-party application (e.g., a loyalty application) with automatic authentication methods available on a device. For networks controlled by a third party (e.g., an owner of a fast food restaurant, a retail store, etc.) and managed by an authentication provider (e.g., a network service provider), the capabilities of the mobile application are leveraged with the capabilities of authentication technologies (e.g., 802.1X and Passpoint technologies) inherent in end-user devices. The authentication provider may utilize a user's shadow credentials to provide auto-authentication services without discovering the user's actual credentials. A third-party's loyalty user may seamlessly authenticate onto the third party's network with the security and privacy provided by industry standard protocols such as Extensible Authentication Protocol (EAP). In near real-time, the authentication provider may notify the third party that the user is now at a third-party location (e.g., a restaurant or a retail sore). The third party may then use push notifications to provide a branded experience throughout the user's visit.

For embodiments that use Passpoint technologies, users are connected and/or authenticated without any effort on their part and without explicit service interruption. Passpoint offers carrier grade identification of users. Since the connection between the device and the network occurs on a pre-surveyed network boundary, the location of the device is definite and is not determined based on GPS and/or an identification of the device, which eliminates confusion about which point of interest (POI) the user is visiting.

In certain embodiments, the user's actual credentials may be linked with shadow (i.e., anonymous) credentials. The authentication provider providing the automatic authentication services (e.g., a network service provider) may learn the user's shadow credentials but may never learn the user's actual credentials and/or the user's physical location. The third party may discover the user's network visitation through the authentication provider and can then link the user's shadow credentials to the user's actual credentials to identify the user.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which:

FIG. 6 illustrates an example table showing a relationship between a user's actual credentials and the user's shadow credentials.

DETAILED DESCRIPTION

Captive portals are typically used by third parties that offer network services to users. Captive portals provide branding opportunities (e.g., "Welcome to Restaurant X") and force each user to agree to terms of service for using the third-party network. Until the user has acknowledged and agreed to the terms, network access is blocked.

Unlike captive portals, the seamless automatic authentication systems and methods described in this disclosure do not block access to the network until explicit consent is given. Automatic authentication is linked to a third-party application, and consent is included as part of the terms and conditions of downloading and using the third-party application. Once the third-party application is downloaded and the user logs onto the third-party application, the user has provided permission to automatically authenticate with any of the third-party's networks. For example, if the user downloads a third-party application for Restaurant X, the terms and conditions for using the third-party application include permission to automatically authenticate whenever the user enters Restaurant X. The user may seamlessly join the third-party's network with full access and without any user interaction. As such, embodiments of this disclosure use information from third-party applications to automatically authenticate a user to a third-party's network.

Figure 1:
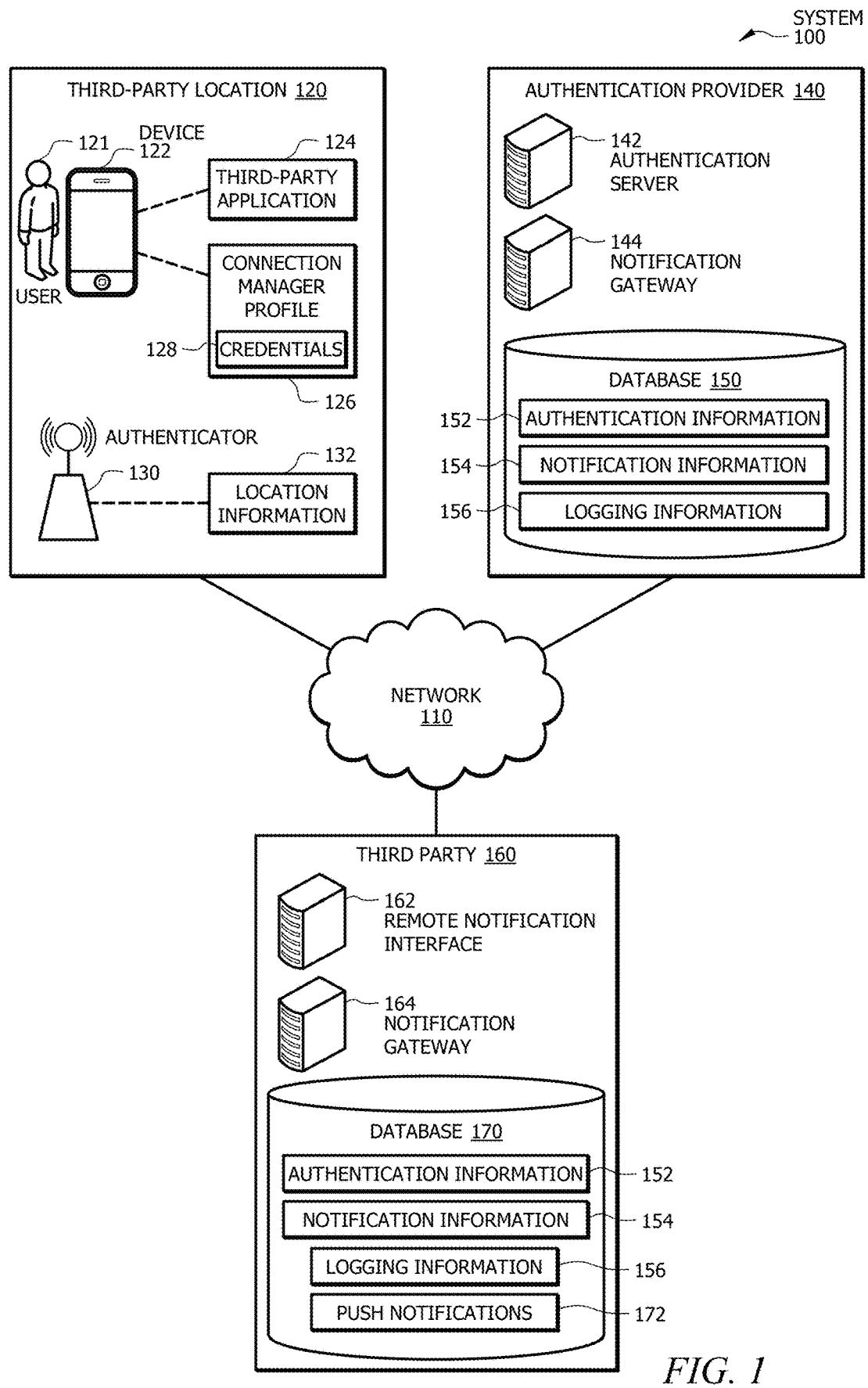
FIG. 1 illustrates an example system for automatically authenticating a user to a third-party network.
Figure 2:
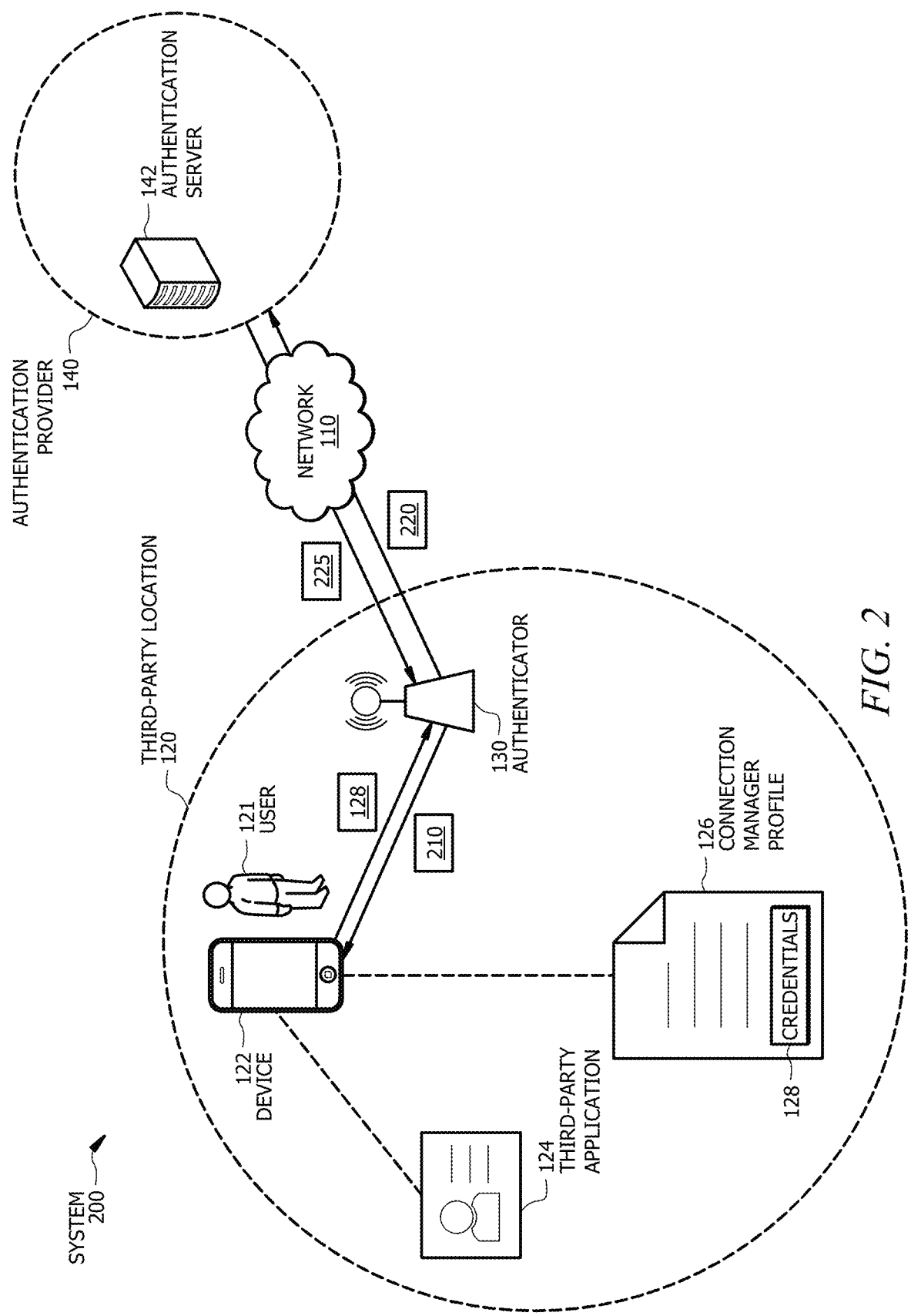
FIG. 2 illustrates an example system for automatically authenticating a user to a third-party network taken from the perspective of a third-party location.
Figure 3:
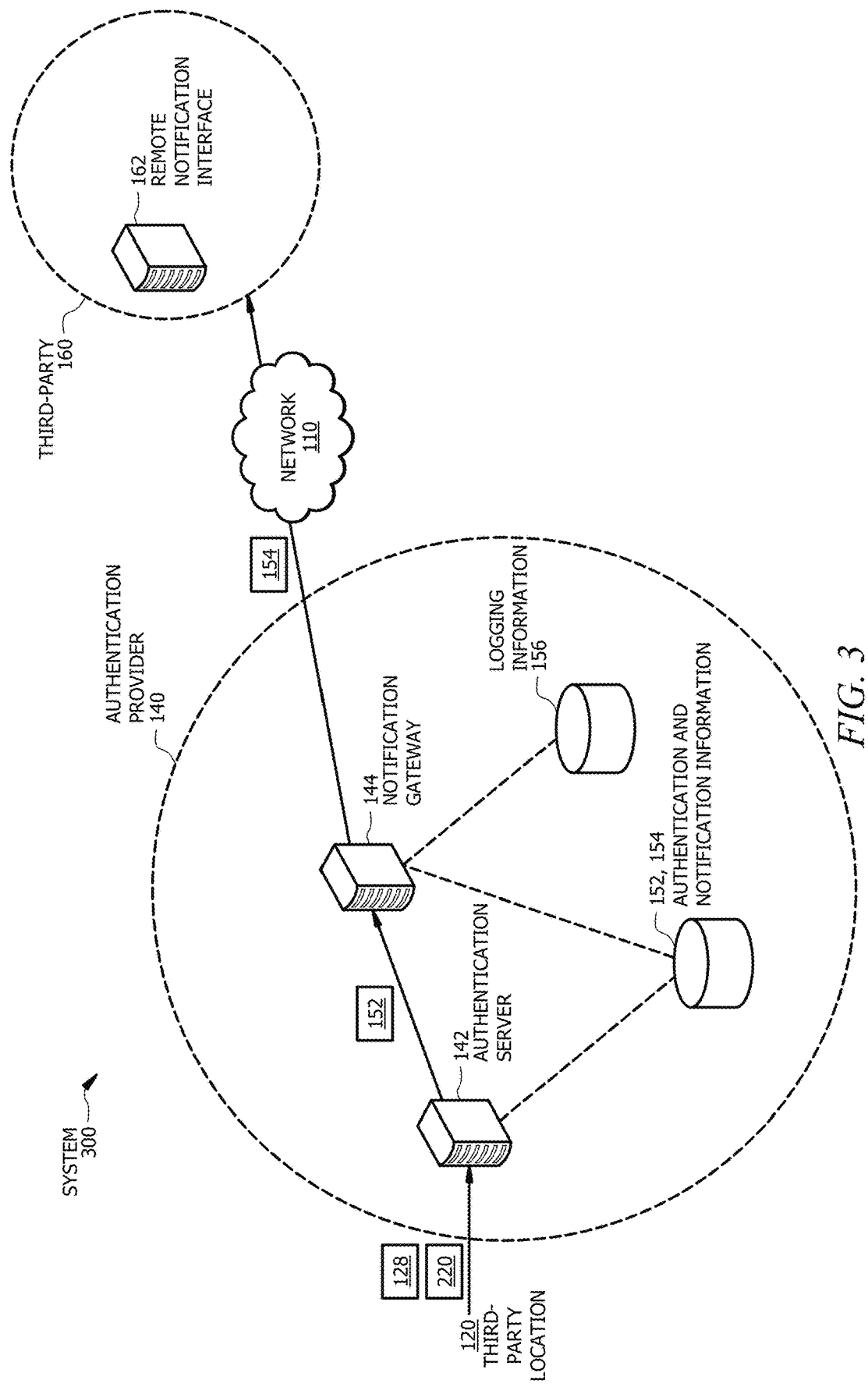
FIG. 3 illustrates an example system for automatically authenticating a user to a third-party network taken from the perspective of an authentication provider providing the authentication service.
Figure 4:
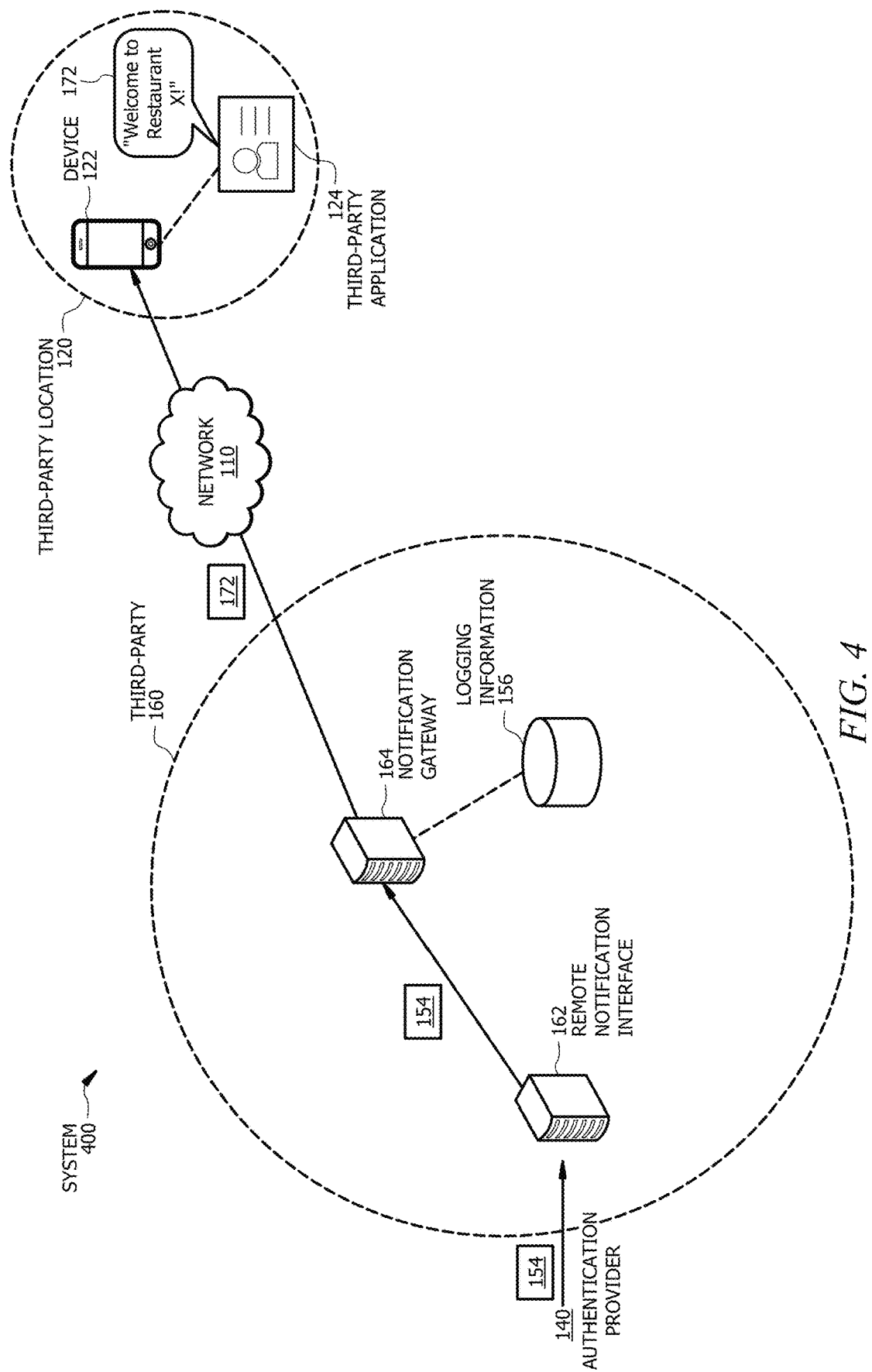
FIG. 4 illustrates an example system for automatically authenticating a user to a third-party network taken from the perspective of a third party.
Figure 5:
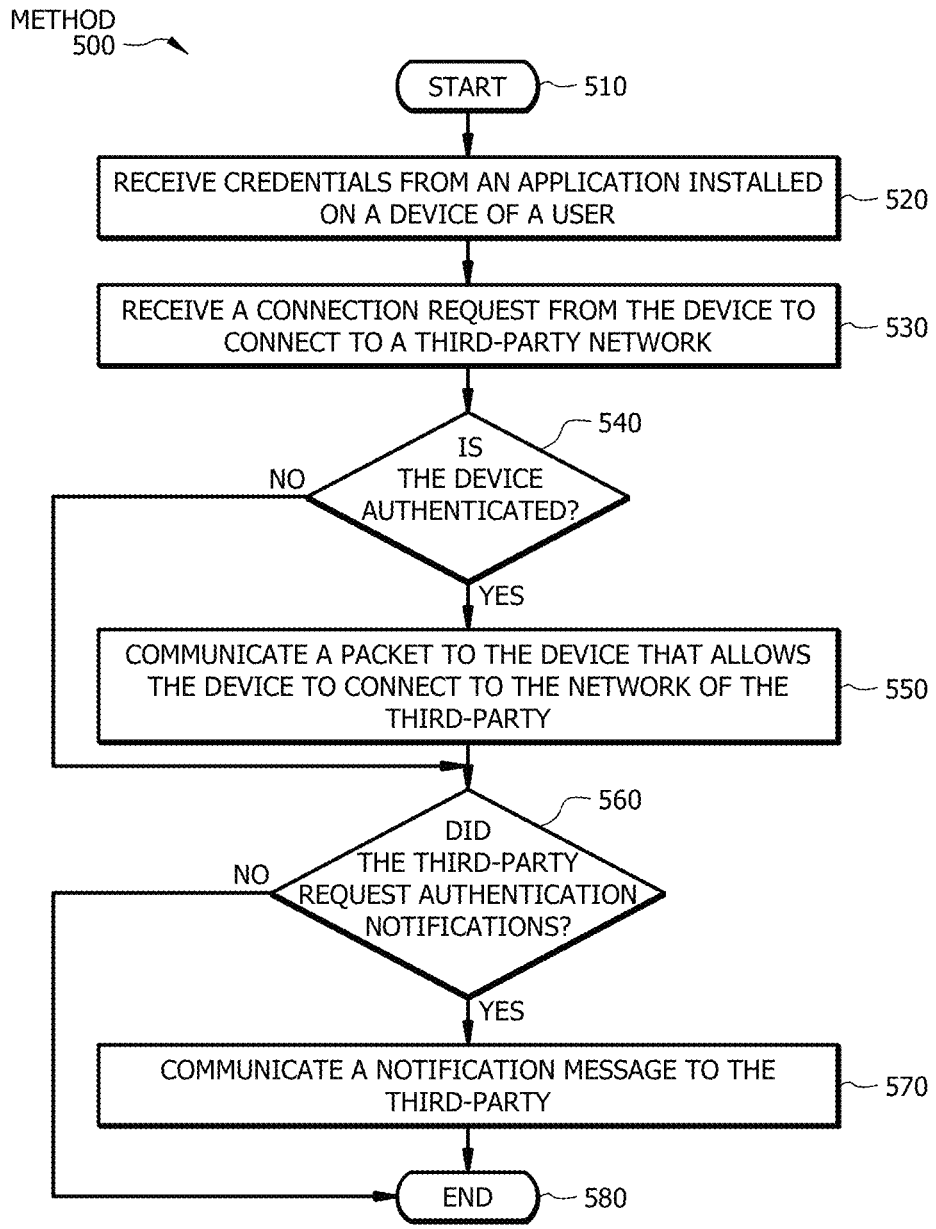
FIG. 5 illustrates an example method for automatically authenticating a user to a third-party network.
Figure 7:
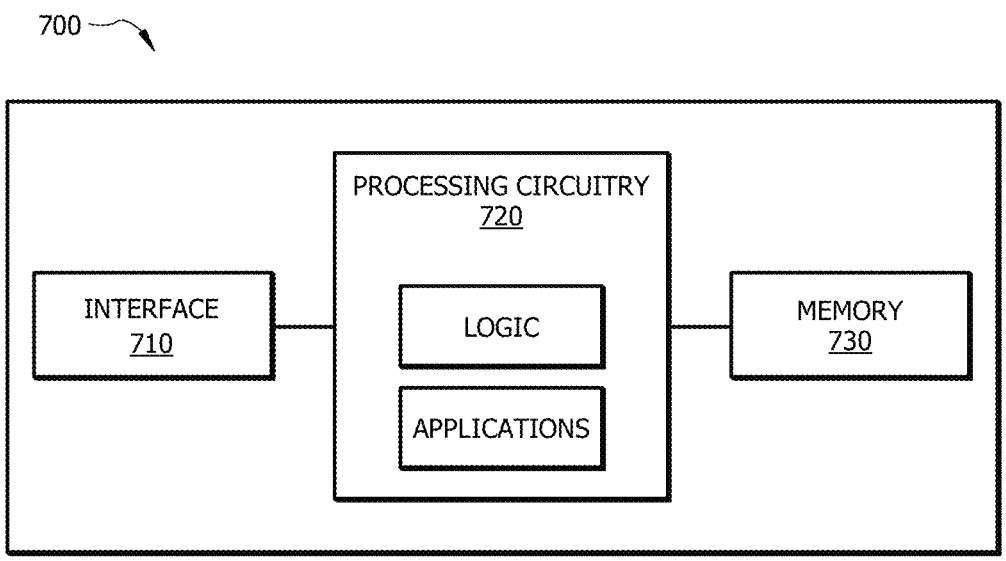
FIG. 7 illustrates an example computer system that may be used by the systems and methods described herein.

FIGS. 1 through 7 show example systems and methods for automatically authenticating users to a third-party's network. FIG. 1 shows an example system for automatically authenticating a user to a third-party network. FIGS. 2-4 show example systems for automatically authenticating a user to a third party taken from different perspectives. FIG. 2 shows an example system for automatically authenticating a user to a third-party network taken from the perspective of a third-party location, FIG. 3 shows an example system for automatically authenticating a user to a third-party network taken from the perspective of an authentication provider providing the authentication service, and FIG. 4 shows an example system for automatically authenticating a user to a third-party network taken from the perspective of a third party. FIG. 5 shows an example method for automatically authenticating a user to a third-party network. FIG. 6 shows an example table illustrating a relationship between a user's actual credentials and the user's shadow credentials. FIG. 7 shows an example computer system that may be used by the systems and methods described herein.

FIG. 1 illustrates an example system 100 for automatically authenticating a user 121 to a network 110 of a third party 160. System 100 includes network 110, a third-party location 120, an authentication provider 140, and third party 160. Third-party location 120 is associated with user 121, a device 122, a third-party application 124, a connection manager profile 126, an authenticator 130, and location information 132. Authentication provider 140 is associated with an authentication server 142, a notification gateway 144, and a database 150. Third party 160 is associated with a remote notification interface 162, a notification gateway 164, and a database 170. The components of system 100 are described below.

Network 110 may be any type of network that facilitates communication between components of system 100. Network 110 may use the Internet to connect components associated with third-party location 120, authentication provider 140, and third party 160 of system 200. Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. Network 110 may be any communications network, such as a private network, a public network, a connection through Internet, a mobile network, a WI-FI network, a Bluetooth network, and the like. One or more components of system 100 may communicate over network 110. For example, device 122 associated with third-party location 120 may communicate over network 110, including transmitting information to authenticator 130 and receiving information from authentication server 142 of authentication provider 140. One or more components of network 110 may include one or more access, core, cloud, and/or edge networks. Network 110 may include one or more subnetworks. One or more portions of network 110 may be controlled by third party 160.

Third-party location 120 of system 100 is a physical location associated with a venue owned and/or controlled by third party 160. The venue may be a restaurant, a retail store, an office building, a hotel, a concert hall, and the like. Third-party location 120 may include a physical structure (e.g., a restaurant building) and the physical structure's surrounding environment (e.g., a parking lot). One or more components within third-party location 120 may communicate via a WI-FI network, a Bluetooth network, and the like. The boundaries of third-party location 120 may be defined by the network capabilities of authenticator 130. For example, the boundaries of third-party location 120 may be defined by a WI-FI signal range of authenticator 130. The boundaries of third-party location 120 may be defined by property boundaries. For example, the boundaries of third-party location 120 may be limited to the property controlled by third party 160.

User 121 of third-party location 120 is any person, organization, or software program that utilizes device 122. User 121 may utilize device 122 at third-party location 120, as illustrated in FIG. 1. For example, user 121 may be a customer that utilizes device 122 at a venue (e.g., a restaurant) owned by third party 160. User 121 may use device 122 to connect to one or more portions of network 110. Authentication may be required prior to user 121 accessing network 110. Access to network 110 may include access to browser sessions and/or background and foreground application data communications.

Device 122 of system 100 represents any suitable computing component that may be used to communicate information. Device 122 may include a mobile device such as a phone (e.g., a smartphone), a laptop computer, a tablet computer, a personal digital assistant (PDA), wearables (e.g., a smart watch), and the like. Device 122 has wireless network connection capabilities and may be used to connect to network 110. For example, device 122 may connect to network 110 via a WI-FI and/or Bluetooth connection. Device 122 may support authentication technologies such as 802.1X and/or Passpoint technologies. Passpoint, which uses the same technology used in the radio access network (RAN), works with device 122 to derive secret keys and encrypt an air interface. Device 122 may be an edge device that provides an entry point into network 110. Device 122 may be implemented using any suitable combination of hardware, firmware, and software. For example, device 122 may be implemented using one or more components of the computer system of FIG. 7. One or more third-party applications 124 may be installed on device 122 for access by one or more users 121.

Third-party application 124 is a software application provided by third party 160. For example, third-party application 124 may be provided by an owner of a restaurant (e.g., a fast food chain, a coffee shop, etc.) or an owner of a retail store (e.g., a clothing store, a shoe store, etc.) Third-party application 124 may be controlled and/or owned by third party 160.

Third-party application 124 may be associated with a customer loyalty program. A customer loyalty program is a rewards program offered by third party 160 to customers who frequently make purchases. The customer loyalty program may provide user 121 of device 122 free merchandise, rewards, coupons, advance released products, and the like. User 121 of device 122 may determine which third-party applications 124 to install on device 122.

Prior to user 121 of device 122 downloading and/or using third-party application 124, third-party application 124 may require that user 121 of device 122 consent to terms and conditions of downloading and using third-party application 124. Upon a user 121 of device 122 downloading and logging into third-party application 124, user 121 provides permission to automatically authenticate onto one or more networks 110 of third party 160. For example, if user 121 downloads third-party application 124 for Restaurant X, the terms and conditions for using third-party application 124 for Restaurant X may include permission to automatically authenticate whenever user 121 enters Restaurant X. In addition to terms of service for the application, third-party application 124 may provide an additional opt-in and/or opt-out feature (e.g., a toggle button) within third-party application 124. If user 121 of device 122 opts out, connection manager profile 126 containing credentials 128 is disabled.

User 121 may establish one or more credentials 128 (e.g., a username and/or password) to access third-party application 124. User 121 may establish one or more credentials 128 by inputting one or more credentials 128 into device 122. Credentials 128 may include a username, a password, a token, a certificate, a combination thereof, and the like. For example, credentials 128 may include a username combined with a token or certificate. The username may be an email address of user 121 or a chosen or assigned identity. User 121 is authenticated to third party 160 through one or more credentials 128 (e.g., a password or a temporary token). Authenticating onto network 110 may be based on independent shadow credentials (e.g., a username/password, token, certificate, etc.) Shadow credentials are discussed in FIG. 6 below.

Third-party application 124 may generate one or more credentials 128 for automatic authentication. When user 121 logs into third-party application 124, third-party application 124 may hash the username associated with third-party application with a key (e.g., a pre-shared algorithm/key) to derive a user identification. If third-party application 124 runs on different devices 122, third-party application 124 may independently derive the same user identification for a given third-party username. Third-party application 124 may derive a device identification for device 122 by querying an operating system (OS) of device 122 to determine a unique identifier such as the media access control (MAC) address.

Third-party application 124 may receive one or more credentials 128 from one or more components of system 100. For example, third-party application 124 may receive one or more credentials 128 (e.g., shadow credentials) from authentication server 142 of authentication provider 140. Third-party application 124 may receive information from one or more components of system 100 and use the information to generate credentials 128. For example, third-party application 124 may receive a token, key, and/or algorithm from authentication server 142 and use the token, key, and/or algorithm to generate credentials 128.

Third-party application 124 may create modify (e.g., replace, add, and/or delete) credentials 128 whenever users 121 persistently log into third-party application 124. Third-party application 124 may communicate added and/or deleted users 121 to authentication server 142 of authentication provider 140. Third-party application 124 may communicate modified credentials 128 to authentication server 142 of authentication provider 140. Third-party application 124 uses credentials 128 to create connection manager profile 126.

Connection manager profile 126 of device 122 is an application that manages a wireless connection (e.g., a WI-FI connection) between device 122 and network 110 of third party 160. Connection manager profile 126 may be a WI-FI connection profile that assists device 122 in connecting to authenticator 130 (e.g., an access point) via a WI-FI connection. Connection manager profile 126 includes credentials 128 used for automatic authentication. Credentials 128 include a user identification (e.g., a username and/or password) and a device identification (e.g., a MAC address).

Authenticator 130 of system 100 represents a networking hardware device (e.g., an access point) located within the boundaries of third-party location 120. Authenticator 130 allows devices 122 located within third-party location 120 to connect to network 110. Authenticator 130 may include a router (e.g., a wireless router) and/or be connected to a router to provide access to network 110. Authenticator 130 may be connected (e.g., hardwired) to other devices (e.g., network switches or broadband modems). Authenticator 130 may be a WI-FI device. Authenticator 130 may be an edge device operating in an edge network that provides an entry point into network 110. Authenticator 130 may allow devices 122 that have been automatically authenticated by one or more components (e.g., authentication server 142) of authentication provider 140 to connect to network 110. Authenticator 130 may be implemented using any suitable combination of hardware, firmware, and software. For example, authenticator 130 may be implemented using one or more components of the computer system of FIG. 7.

Authenticator 130 is associated with specific location information 132. Location information 132 includes a location where authenticator 130 is located. Location information 132 may include a geographic location (e.g., global positioning system (GPS) coordinates), a physical address (e.g., a postal address), a restaurant identifier (e.g., a restaurant name and/or number), a store identifier (e.g., a store name and/or number), and the like. Location information 132 may be stored in a memory of authenticator 130. Location information 132 may be used by third party 160 to communicate information (e.g., push notifications 172) to device 122 when user 121 of device 122 accesses network 110 through authenticator 130 associated with location information 132.

Since the connection between device 122 and authenticator 130 occurs on a pre-surveyed network boundary, location information 132 is definite and is not determined based on GPS and/or an identification of device 122, which eliminates confusion about which point of interest (POI) user 121 is visiting. System 100 works independently of geolocation services such that location information 132 can be reliably determined underground and indoors. Embodiments of system 100 do not require location services for device 122 to be tuned on, which may save power. Embodiments of system 100 do not require users 121 to give access to location services, which is less intrusive than traditional authentication methods. Embodiments of system 100 do not leak location information 132 to authentication providers 140 by calling a geofence service and/or exposing geolocation coordinates.

Authentication provider 140 of system 100 is an authentication provider (e.g., an individual, business, or company) that provides automatic authentication services to third party 160. Authentication provider 140 may be a network service provider (e.g., an Internet service provider), a telecommunications company, a data carrier, a wireless communications provider, a cable television operator, and the like. Authentication provider 140 may provide one or more services (e.g., auto-authentication services) to one or more users 121 (e.g., third-party customers) via network 110. Authentication provider 140 may perform one or more actions such as managing one or more portions of network 110, automatically authenticating one or more users 121, communicating notifications to third party 160, storing data, storing programs, and the like. Authentication provider 140 may be associated with third party 160. For example, authentication provider 140 may partner with third party 160 to provide automatic authentication services for authentication provider 140.

Authentication provider 140 may control and/or own authentication server 142, notification gateway 144, and/or database 150. One or more of authentication server 142, notification gateway 144, and/or database 150 may be located on the premises of authentication provider 140 and/or in a cloud environment. One or more of authentication server 142, notification gateway 144, and/or database 150 used by authentication provider 140 may operate in a cloud network. The cloud network may utilize networking resources from a provider other than authentication provider 140 using WAN and/or Internet-based access technologies. The cloud network may be implemented using any suitable combination of hardware, firmware, and software. For example, the cloud network may be implemented using one or more components of the computer system of FIG. 7.

Authentication server 142 associated with authentication provider 140 is an application that facilitates automatic authentication of user 121 of device 122. Authentication server 142 may automatically authenticate user 121 upon the arrival of user 121 at third-party location 120. Authentication is used to determine whether user 121 of device 122 is authorized to use network 110. Authentication server 142 may reside on a computer, an Ethernet switch, an access point, a network access server, or the like. Authentication server 142 is used to authenticate credentials 128 associated with user 121 and device 122.

Authentication server 142 may automatically authenticate user 121 upon the arrival of user 121 at third-party location 120 if user 121 is logged into third-party application 124 on device 122. However, user 121 is not required to interact with or open third-party application 124 for automatic authentication to occur. If user 121 is not logged into third-party application 124, automatic authentication will not occur. Automatic authentication occurs on behalf of user 121 who is logged into third-party application 124. For example, if first user 121 is logged into third-party application 124, automatic authentication will be on behalf of first user 121. If first user 121 logs out of third-party application 124 and second user 121 logs into third-party application 124, auto-authentication will be on behalf of second user 121. Authentication server 142 may transmit information (e.g., authentication information 152) to notification gateway 144.

Authentication server 142 may receive first credentials 128 from third-party application 124 installed on device 120. Authentication server 142 may receive a connection request from device 122, which may be routed through authenticator 130. The connection request includes second credentials 128. The connection request is automatically generated by device 122 without interaction from user 121 and without requiring third-party application 124 to be open. Authentication server 142 determines whether to authenticate device 122 by comparing first credentials 128 and second credentials 128. If authentication server 124 determines that first credentials 128 and second credentials 128 match, authentication server 142 automatically authenticates device 122 and communicates a packet to authenticator 130, which allows authenticator 130 to admit device 122 to network 110.

Notification gateway 144 associated with authentication provider 140 is a device that acts as a gateway between two subnetworks of network 110. For example, notification gateway 144 may act as a gateway between a cloud network of authentication provider 140 and a third-party network of third party 160. Notification gateway 144 may receive information (e.g., authentication information 152, notification information 154, and/or logging information 156) from authentication server 142 and transmit information to remote notification interface 162 of third party 160. Notification gateway 144 may be a router, a firewall, a server, or any other suitable device that enables traffic to flow in and out of network 110. Notification gateway 144 may be implemented using any suitable combination of hardware, firmware, and software. For example, notification gateway 144 may be implemented using one or more components of the computer system of FIG. 7.

Database 150 of authentication provider 140 stores certain types of information for authentication provider 140. For example, database 150 may store authentication information 152, notification information 154, logging information 156, and the like. Authentication information 152 may include the following information: one or more credentials 128 (e.g., an identification of user 121 and/or an identification of device 122), a time when a connection request was received by authentication server 142, a date when the connection request was received by authentication server 142, a location of device 122 at the time the connection request was received by authentication server 142, a result of determining whether to authenticate device 122, a connection mechanism, and the like.

The identification of user 121 may be a username, a password, a combination thereof, or any other suitable identification associated with third-party application 124 that identifies user 121 of device 122. The identification of user 121 may be a shadow (i.e., anonymous) user identification. The identification of device 122 may include a MAC address, a unique device ID (UDID), a hardware serial number, a combination thereof, or any other suitable identification that identifies device 122. The identification of device 122 may be a shadow device identification. The location of device 122 may include a geographic location (e.g., GPS coordinates), a physical address (e.g., a postal address), a restaurant identifier (e.g., a restaurant name and/or number), a store identifier (e.g., a store name and/or number), and the like. The location of device 122 may be a shadow location. The result of determining whether to authenticate device 122 may include a success and/or a failure to authenticate device 122. The connection mechanism may use an EAP framework. For example, the connection mechanism may be an EAP-Authentication and Key Agreement (EAP-AKA), an EAP-Transport Layer Security (EAP-TLS), an EAP-Tunneled Transport Layer Security (EAP-TTLS), an EAP-Protected Extensible Authentication Protocol (EAP-PEAP), an EAP-PEAP with service set identifier (SSID), or the like. The EAP-AKA connection mechanism may use a public land mobile network (PLMN) such as 310/410 (PLMN).

Notification information 154 includes authentication information 152 that is communicated by authentication provider 140 to third party 160. For example, notification information 154 may include an identification of user 121, an identification of device 122, a time when a connection request was received by device 122, and a result of determining whether to authenticate device 122. Notification information 154 may be communicated to third party 160 in the form of a message (e.g., an email message or a text message), a report, a spreadsheet, a document, and the like. Logging information 156 is authentication information 152 that is logged by authentication provider 140. Logging information 156 may include a log file that records automatic authentication events. Logging information 156 may include some or all events performed by one or more components (e.g., authentication server 142) of system 100.

Database 150 may be any one or a combination of volatile or non-volatile local or remote devices suitable for storing information. Database 150 may include random access memory (RAM), read-only memory (ROM), magnetic storage devices, optical storage devices, or any other suitable information storage device or a combination of these devices. Database 150 may be located in any location (e.g., on the premises of authentication provider 140 or in a cloud environment) suitable to store information associated with authentication provider 140. While database 150 is shown as a single database 150 in the illustrated embodiment of FIG. 1, database 150 may include multiple databases 150. Database 150 may be implemented using any suitable combination of hardware, firmware, and software. For example, database 150 may be implemented using one or more components (e.g., memory 730) of the computer system of FIG. 7.

Third party 160 of system 100 is any individual, business, or company that controls and/or owns one or more third-party locations 120. For example, third party 160 may be a restaurant owner associated with one or more restaurants. As another example, third party 160 may be an owner of a retail establishment associated with one or more retail stores. Third party 160 may perform one or more actions such as providing third-party applications 124 to users 121 of devices 122, managing third-party applications 124, providing information (e.g., credentials 128) to authentication provider 140, pushing notifications 172 to device 122, and the like. Third party 160 may be associated with authentication provider 140. For example, third party 160 may partner with authentication provider 140 to receive automatic authentication services from authentication provider 140.

Third party 160 may control and/or own remote notification interface 162, notification gateway 164, and/or database 170. One or more of remote notification interface 162, notification gateway 164, and/or database 170 may be located on the premises of authentication provider 160 and/or in a cloud environment. One or more of remote notification interface 162, notification gateway 164, and/or database 170 may operate in a cloud network. The cloud network may utilize networking resources from a provider other than third party 160 using WAN and/or Internet-based access technologies. The cloud network may be implemented using any suitable combination of hardware, firmware, and software. For example, the cloud may be implemented using one or more components of the computer system of FIG. 7.

Third party 160 may provide a third-party network to device 122. The third-party network is accessed by device 122 through authenticator 130 that is owned and/or controlled by third party 160. The third-party network may be implemented using any suitable combination of hardware, firmware, and software. For example, the third-party network may be implemented using one or more components of the computer system of FIG. 7.

Remote notification interface 162 associated with third-party 160 represents any suitable computer element that can receive information from network 110, transmit information through network 110, perform suitable processing of the information, communicate to other components of system 100, or any combination of the preceding. Remote notification interface 162 may receive authentication information 152, notification information 154, and/or logging information 156 from one or more components (e.g., notification gateway 144) of authentication provider 140, for example. Remote notification interface 162 may transmit push notifications 174 to device 122 of location 120, as another example. Remote notification interface 162 represents any port or connection, real or virtual, including any suitable combination of hardware, firmware, and software, including protocol conversion and data processing capabilities, to communicate through a LAN, a WAN, or other communication system that allows system 100 to exchange information between components of system 100. Remote notification interface 162 may be implemented using any suitable combination of hardware, firmware, and software. For example, remote notification interface 162 may be implemented using one or more components (e.g., interface 710) of the computer system of FIG. 7.

Notification gateway 164 of third party 160 is a device that acts as a gateway between two subnetworks of network 110. For example, notification gateway 164 may act as a gateway between a third-party network of third party 160 and a cloud network of authentication provider 140. Notification gateway 164 may receive information (e.g., authentication information 152, notification information 154, and/or logging information 156) from one or more components of system 100 (e.g., remote notification interface 162) and transmit information (e.g., push notifications 172) to one or more components of system 100 (e.g., device 122). Notification gateway 164 may be a router, a firewall, a server, or any other suitable device that enables traffic to flow in and out of network 110. Notification gateway 164 may be implemented using any suitable combination of hardware, firmware, and software. For example, notification gateway 164 may be implemented using one or more components of the computer system of FIG. 7.

Database 170 of third party 160 stores information for third party 160. For example, database 150 may store authentication information 152, notification information 154, and logging information 156 received from one or more components of authentication provider 140. As another example, database 150 may store push notifications 172. Push notifications 172 are messages communicated to device 122 by third party 160. Push notifications 172 may be communicated to device 122 in response to third party 160 receiving notification information 152 from authentication provider 140. For example, one or more push notifications 172 may be communicated to device 122 in response to remote notification interface 162 of third party 160 receiving notification information 152 indicating that device 122 has arrived at third-party location 120. Push notifications 172 may include information associated with third party 160. Push notifications 172 may include advertisements, promotions, coupons, news updates, weather reports, updates, reminders, and the like. Push notifications 172 may be communicated in the form of text alerts, badges, sounds, and the like. Push notifications 172 may be communicated to device 122 at any time. For example, push notifications 172 may be communicated to device 122 when third party 160 receives notification information 154 indicating that user 121 arrived at third-party location 120 and has been automatically authenticated. User 121 of device 122 may have third-party application 124 open or closed when push notification 172 is communicated to device 122.

Database 170 may be any one or a combination of volatile or non-volatile local or remote devices suitable for storing information. Database 170 may include RAM, ROM, magnetic storage devices, optical storage devices, or any other suitable information storage device or a combination of these devices. Database 170 may be located in any location (e.g., the premises of third party 160 or a cloud environment) suitable to store information associated with third party 160. While database 170 is shown as a single database 170 in the illustrated embodiment of FIG. 1, database 170 may include multiple databases 170. Database 170 may be implemented using any suitable combination of hardware, firmware, and software. For example, database 170 may be implemented using one or more components (e.g., memory 730) of the computer system of FIG. 7.

Although FIG. 1 illustrates a particular arrangement of network 110, third-party location 120, device 122, third-party application 124, connection manager profile 126, authenticator 130, location information 132, authentication provider 140, authentication server 142, notification gateway 144, database 150, third party 160, remote notification interface 162, notification gateway 164, and database 170, this disclosure contemplates any suitable arrangement of network 110, third-party location 120, device 122, third-party application 124, connection manager profile 126, authenticator 130, location information 132, authentication provider 140, authentication server 142, notification gateway 144, database 150, third party 160, remote notification interface 162, notification gateway 164, and database 170. Network 110, third-party location 120, device 122, third party application 124, connection manager profile 126, authenticator 130, location information 132, authentication provider 140, authentication server 142, notification gateway 144, database 150, third party 160, remote notification interface 162, notification gateway 164, and database 170 may be physically or logically co-located with each other in whole or in part.

Although FIG. 1 illustrates a particular number of networks 110, third-party locations 120, devices 122, third-party applications 124, connection manager profiles 126, authenticators 130, location information 132, entities 140, authentication servers 142, notification gateways 144, databases 150, third parties 160, remote notification interfaces 162, notification gateways 164, and databases 170, this disclosure contemplates any suitable number of networks 110, third-party locations 120, devices 122, third-party applications 124, connection manager profiles 126, authenticators 130, location information 132, entities 140, authentication servers 142, notification gateways 144, databases 150, third parties 160, remote notification interfaces 162, notification gateways 164, and databases 170. For example, system 100 may include multiple devices 122 and/or authenticators 130.

In operation, authentication server 142 of authentication provider 140 receives first credentials 128 from third-party application 124 installed on device 120. User 121 of device 122 later arrives at third-party location 120. Authenticator 130 (e.g., an access point) located at third-party location 120 advertises automatic authentication possibilities to device 122 by transmitting a signal (e.g., an SSID such as an 802.11u beacon) to device 122. In response to receiving the signal, device 122 communicates a connection request to authenticator 130, which routes back to authentication sever 142 of authentication provider 140. The connection request, which includes second credentials 128, is automatically generated by device 122 without interaction from user 121 and without requiring third-party application 124 to be open. Authentication server 142 determines whether to authenticate device 122 by comparing first credentials 128 and second credentials 128. If authentication server 142 determines that first credentials 128 and second credentials 128 are the same, authentication server 142 automatically authenticates device 122 and communicates a packet to authenticator 130, which allows authenticator 130 to admit device 122 to network 110.

As such, system 100 of FIG. 1 automatically authenticates user 121 upon arrival of user 121 at third-party location 120 without requiring user 121 to interact with third-party application 124, which provides a seamless connection experience without any effort from user 121 and without explicit service interruption.

FIG. 2 illustrates an example system 200 for automatically authenticating user 121 taken from the perspective of third-party location 120 of FIG. 1. System 200 includes network 110, third-party location 120, user 121, device 122, third-party application 124, connection manager profile 126, credentials 128, authenticator 130, authentication provider 140, and authentication server 142. The components of FIG. 2 are described above in the description of FIG. 1.

One or more components of system 200 may perform one or more of the following steps to automatically authenticate user 121 to network 110 when user 121 has existing credentials 128 for automatic authentication. User 121 may have existing credentials 128 if user 121 downloaded third-party application 124 prior to visiting third-party location 120. Upon the arrival of user 121 to third-party location 120, authenticator 130 may communicate a service advertisement 210 to a connection manager of device 122. For example, authenticator 130 may advertise automatic authentication possibilities to device 122 by transmitting a signal (e.g., an SSID) to device 122. For devices 122 that support Passpoint, authenticator 130 may advertise Passpoint authentication possibilities with a beacon (e.g., an 802.11u beacon). For devices 122 that do not support Passpoint, authenticator 130 may advertise a pre-arranged SSID.

After receiving service advertisement 210, device 122 determines whether to attempt a connection to network 110 using one or more credentials 128 stored in connection manager profile 126 of device 122. For example, device 122 may determine to attempt a network connection using one or more stored credentials 128 in response to receiving the 802.11u beacon. If device 122 is not 802.11u-capable, device 122 may check for a matching SSID-based configuration.

Device 122 chooses one or more credentials 128 (e.g., a restaurant's Password Authentication Protocol (PAP) username) to communicate to authenticator 130. Device 122 then communicates one or more credentials 128 to authenticator 130 using a connection mechanism (e.g., EAP-TTLS). For example, in response to device 122 receiving service advertisement 210 (e.g., EAP/Request/entity), device 122 may communicate a connection request 220 (e.g., EAP/Response/identity and username "anonymous@restaurantx.com") to authenticator 130. Authenticator 130 communicates connection request 220 received from device 122 to authentication server 142 of authentication provider 140. Authentication server 142 of authentication provider 140 consults proxy information and determines whether to manage connection request 220 locally or proxy connection request 220 to a third-party server.

If authentication provider 140 determines to proxy connection request 220, authentication server 142 of authentication provider 140 forwards connection request 220 (e.g., a packet) to the third-party server. The third-party server may be controlled and/or owned by third party 160 or another third party. The third-party server may be a Remote Authentication Dial-In User Service (RADIUS) server. The third-party server receives connection request 220 (e.g., EAP.Response/Identity) and the username (e.g., anonymous@venue.com). The third-party server becomes the authentication server in the chain. Proxying connection request 220 is only applicable if actual credentials 128 are used. If shadow (i.e., anonymized) credentials 128 are used, authentication server 142 controlled by authentication provider 140 manages connection request 220.

The authentication server (e.g., authentication server 142 of authentication provider 140 or the third-party authentication server) may communicate a message (e.g., an EAP/Request/EAP-TTLS/Identity message) to third party 160 to begin a Transport Layer Security (TLS) handshake negotiation with third party 160. If the handshake is successful, the authentication server and third party 160 derive keying material and set up a TLS tunnel to carry TLS records in the EAP payload of the RADIUS packets. Both endpoints (e.g., the authentication server and third party 160) derive the same TLS keys. If the TLS tunnel carries additional authentication credentials (e.g., EAP-TTLS and/or EAP-PEAP), those credentials will be exchanged.

If the authentication server (e.g., authentication server 142) determines to authenticate user 121 of device 122, the authentication server will communicate a packet 225 (e.g., a RADIUS Access-Accept packet) to authenticator 130, which allows authenticator 130 to admit device 122 to third-party location 120. The connection manager of device 122 is then able to connect to network 110.

One or more components of system 200 may perform one or more of the following steps to automatically authenticate user 121 to network 110 when user 121 does not have existing credentials 128 to connect to network 110. User 121 of device 122 may arrive at third-party location 120. To facilitate application-based authentication, third-party location 120 may have an open SSID that is protected by a captive portal web page. The captive portal web page explains to user 121 of device 122 that normal authentication is provided by another protected mechanism that requires third-party application 124. User 121 may select an option that allows the captive portal web page to take user 121 to a site (e.g., an application store) that allows user 121 to download and/or enable third-party application 124. The open SSID may only allow access to the site(s) (e.g., the application store) necessary to download third-party application 124. In alternative embodiments, user 121 may be permitted to download an application to authenticate at the captive portal and continue on to network 110.

If user 121 chooses to download third-party application 124, third-party application 124 is installed on device 122 of user 121. Once installed, third-party application 124 will grant user 121 restricted access to network 110 and guide user 121 through one or more of the following steps to connect to network 110: create and exchange credentials 128, register credentials 128 with authentication provider 140, create connection manager profile 126, and disassociate from the restricted network connection. The connection manager of device 122 will then attempt to reassociate with network 110 by performing one or more steps described above for automatically authenticating user 121 to network 110 when user 121 has existing credentials 128 for automatic authentication.

In the event user 121 of device 122 logs out of third-party application 124, one or more of the following "logging out" steps may be performed by one or more components of system 200. Third-party application 124 may send a message to authentication server 142 of authentication provider 140 that user 121 is logging out. Authentication server 142 may send a message to a notification system of authentication provider 140 to delete credentials 128 of user 121 from a notification user registry of authentication provider 140. Authentication provider 140 then invalidates credentials 128 in an authentication system of authentication provider 140. A manager of third-party application 124 logs user 121 out of third-party application 124 and invalidates the notification relationship. A device application deletes connection manager profile 126. The connection manager of device 122 disassociates device 122 from network 110. In the event user 121 of device 122 deletes third-party application 124 from device 122, third-party application 124, as part of the deletion, will first perform one or more (e.g., all) of the "logging out" steps previously described and then delete third-party application 124.

Modifications, additions, or omissions may be made to one or more of the steps described above in association with system 200. The steps may include more, fewer, or other steps. The steps may be performed in parallel or in any suitable order. While discussed as specific components completing the steps, any suitable component may perform any step.

FIG. 3 illustrates an example system 300 for automatically authenticating a user (e.g., user 121 of FIG. 1) to network 110 taken from the perspective of authentication provider 140 of FIG. 1. System 300 includes network 110, third-party location 120, authentication provider 140, authentication server 142, notification gateway 144, authentication information 152, notification information 154, logging information 156, third party 160, and remote notification interface 162. The components of FIG. 3 are described above in the description of FIG. 1.

One or more components of authentication provider 140 of system 300 may perform one or more of the following steps to automatically authenticate a user to network 110. Authentication server 124 of authentication provider 140 may receive first credentials from a third-party application (e.g., third-party application 124 of FIG. 1) installed on the user's device. Authentication server 124 may later receive connection request 220 from an authenticator (e.g., authenticator 130 of FIG. 1) located at third-party location 120. Connection request 220 includes second credentials. Authentication server 142 determines whether to authenticate the user's device by comparing the first credentials and the second credentials. If authentication server 142 determines that the first and second credentials are the same, authentication server 142 automatically authenticates the user's device and communicates a packet to the authenticator located at third-party location 120, which allows the authenticator to admit the user's device to network 110.

Authentication server 142 may use one or more of the following methods to automatically authenticate the user: EAP-AKA, EAP-TLS, EAP-TTLS, EAP-PEAP, and/or EAP-PEAP with SSID. For EAP-AKA, authentication server 142 may use an international mobile subscriber identity (IMSI) for the identification of the user. Authentication server 142 may translate a pseudonym used as the identification of the user into the IMSI with a key (e.g., a $K_{pseu}$ key). Authentication server 142 may translate a fast reauthentication-identifier used as an identification of the device into the IMSI with the key. For EAP-TLS, authentication server 142 may use an EAP/Identity attribute. Specifically, authentication server 142 may use a common name (CN) attribute from a certificate that third party 160 presents in a TLS message (e.g., a "client hello" message). For EAP-TTLS, EAP-PEAP, and EAP-PEAP with SSID, authentication server 142 may receive a username from EAP packets inside of a tunnel (e.g., a TLS tunnel). The username may be encrypted in a security protocol format by third party 160.

For certificate-using methods (e.g., EAP-TLS, EAP-TTLS, and EAP-PEAP), authentication provider 140 may provide a certificate (e.g., an authentication provider-owned, certificate authority (CA), signed root trust certificate). The third-party application may request that the user install the certificate. Authentication provider 140 may provide a self-signed certificate. Authentication provider 140 may use a globally-signed certificate that a keychain of the user device already trusts. If authentication provider 140 has provided its own root trust certificate, authentication provider 140 may provide third party 160 with new certificates to bundle with the third-party application to replace the authentication provider-signed root trust certificates before they expire. Authentication provider 140 may maintain the immediately-prior certificate for a predetermined time period (e.g., 15 minutes) to allow for transparent migration. Past that predetermined time period, the third-party application may fail to establish trust. The third-party application may now take steps to assist the user. The steps may include generating new shadow credentials and a new connection manager profile for the user and registering the new shadow credentials with third party 160.

Once authentication provider 140 is in possession of the credentials, authentication server 142 of authentication provider 140 may insert the credentials into one or more components of authentication provider 140 (e.g., database 150 of FIG. 1), which allows authentication server 142 to automatically authenticate users without any user interaction. The user does not need to interact with the third-party application or open the third-party application for authentication provider 140 to automatically authenticate the user's device. Authentication server 142 communicates authentication information 152 to notification gateway 144.

Notification gateway 144 of authentication provider 140 may communicate notification information 154 to remote notification interface 162 of third party 160 upon a request of third party 160. Notification information 154 may be in the form of a message that includes one or more of the following: an identification of the user, a time when a connection request was received by authentication server 142, a date when the connection request was received by authentication server 142, a location of the device at the time the connection request was received by authentication server 142, a result of determining whether to authenticate the device, and/or a connection mechanism.

Notification gateway 144 of authentication provider 140 may transmit logging information 156 generated by one or more components of authentication provider 140 to a logging system. Logging information 156 may include authentication information 152 and/or notification information 154. Authentication provider 140 may log logging information 156 regardless of whether third party 160 requests notification information 154.

One or more components (e.g., authentication server 142) of authentication provider 140 may perform one or more of the following actions: add users and credentials, modify users and credentials, delete users and credentials, turn on notifications, and/or turn off notifications. One or more components of authentication provider 140 may install new third-party-enabling credentials and/or delete old credentials in a timely fashion to enable on-site signup and subsequent immediate connection. One or more components of authentication provider 140 may correlate deleted users with newly-created users to maintain continuity. One or more components of authentication provider 140 may maintain a user's authentication history. One or more components of authentication provider 140 may provide some or all of a third party's user authentication history to third party 160.

One or more components (e.g., authentication server 142) of authentication provider 140 may periodically examine the authentication history for abandoned credentials and determine if authentication provider 140 has users in an indeterminate state. Authentication provider 140 may inform third party 160 that third party 160 has users in an indeterminate state. Authentication provider 140 may receive a response from third party 160 instructing authentication provider 140 to either keep or discard information associated with each indeterminate state user. In the event authentication provider 140 does not receive a response from third party 160 after a predetermined amount of time, authentication provider 140 may delete credentials and notification links associated with the indeterminate state users.

Modifications, additions, or omissions may be made to one or more of the steps described above in association with system 300. The steps may include more, fewer, or other steps. The steps may be performed in parallel or in any suitable order. While discussed as specific components completing the steps, any suitable component may perform any step.

FIG. 4 illustrates an example system 400 for automatically authenticating a user (e.g., user 121 of FIG. 1) to network 110 taken from the perspective of third party 160 of FIG. 1. System 400 includes network 110, authentication provider 140, third party 160, remote notification interface 162, notification gateway 164, logging information 156, third-party location 120, device 122, and third-party application 124. The components of FIG. 4 are described above in the description of FIG. 1.

Remote notification interface 162 of system 400 receives notification information 154 from authentication provider 140. Remote notification interface 162 communicates notification information 154 to notification gateway 164. Notification gateway 164 may then communicate push notifications 172 (e.g., "Welcome to Restaurant X!") to device 122 through third-party application 124.

Remote notification interface 162 may be an application program interface (API) that one or more components of authentication provider 140 specifies for third party 160 to implement to receive notification information 154. Remote notification interface 162 may be used to perform one or more of the following actions: add users and credentials, modify users and credentials, delete users and credentials, turn on notifications, and/or turn off notifications.

Third-party 160 may remediate indeterminate state users. Third-party 160 may communicate a message to authentication provider 140 instructing authentication provider 140 to either keep or discard indeterminate state users. Notification gateway 164 of third party 160 may transmit logging information 156 received from one or more components (e.g., notification gateway 144) of authentication provider 140 to a logging system. Logging information 156 may include authentication information 152 and/or notification information 154.

Modifications, additions, or omissions may be made to one or more of the steps described above in association with system 400. The steps may include more, fewer, or other steps. The steps may be performed in parallel or in any suitable order. While discussed as specific components completing the steps, any suitable component may perform any step.

FIG. 5 illustrates an example method for automatically authenticating a user to a network of a third party. Method 500 begins at step 510. At step 520, an authentication server (e.g., authentication server 142 of FIG. 1) controlled by an authentication provider (e.g., authentication provider 140 of FIG. 1) receives first credentials from an application (e.g., third-party application 124 of FIG. 1) installed on a device (e.g., device 124 of FIG. 1). The first credentials may be communicated from the device to the authentication server through an authenticator (e.g., an access point) controlled by a third party. The first credentials include information associated with the device and information associated with a user of the device. For example, the first credentials may include a user identification (e.g., a username and a password) and a device identification (e.g., a MAC address).

At step 530, the authentication server automatically receives, from the device, a connection request to connect the device to a network (e.g., network 110 of FIG. 1) of a third party (e.g., third party 160 of FIG. 1). The connection request may be communicated from the device to the authentication server through the authenticator controlled by the third party. The request includes second credentials and is automatically generated by the device without interaction from the user of the device. At step 540, the authentication server determines whether to authenticate the device by comparing the first credentials and the second credentials. If the authentication server determines that the first and second credentials do not match, the user is not authenticated and method 500 advances to step 560. If the authentication server determines that the first and second credentials match, the user is automatically authenticated and method 500 advances to step 550. At step 550, the authentication server communicates a packet (e.g., a RADIUS Access-Accept packet) to the device that allows the device to connect to the network of the third party.

At step 560, the authentication server determines whether the third party requested authentication notifications. If the authentication server determines that the third party did not request authentication notifications, method 500 advances from step 560 to step 580, where method 500 ends. If the authentication server determines that the third party requested authentication notifications, method 500 advances from step 560 to step 570. At step 570, the authentication server communicates a notification message to the third party. The notification message may include one or more of the following: an identification of the user, a time when the request was received by the authentication server, a date when the request was received by the authentication server, a location of the device at the time the request was received by the authentication server, a result of determining whether to authenticate the device, and a connection mechanism. Method 500 then advances from step 570 to step 580, where method 500 ends.

Modifications, additions, or omissions may be made to method 500 depicted in FIG. 5. Method 500 may include more, fewer, or other steps. For example, method 500 may include logging authentication information. As another example, method 500 may include communicating information to the device if the device is automatically authenticated. Steps of method 500 may be performed in parallel or in any suitable order. While discussed as specific components completing the steps of method 500, any suitable component may perform any step of method 500.

FIG. 6 illustrates an example table showing a relationship between actual credentials 610 for a user (e.g., user 121) of device 122 and shadow credentials 620 for the user of device 122. A third party (e.g., third party 160 of FIG. 1) and/or the user may choose not to share actual credentials 610 with an authentication provider (e.g., authentication provider 140 of FIG. 1). Shadow credentials 620 may be used by an authentication system (e.g., system 100 of FIG. 1) to authenticate the user. Shadow credentials 620 are anonymized credentials that allow the authentication provider to successfully and securely authenticate the user without the authentication provider learning the user's actual credentials 610.

Actual credentials 610 may remain private to a third party hosting a third-party application (e.g., third-party application 124 of FIG. 1). For example, if the third party is associated with a restaurant, a restaurant's customer may create actual credentials 610 (e.g., a username and/or password) for his/her third-party loyalty account. Actual credentials 610 are used to log into the third-party application on device 122 of the user. The third party may manage and secure actual credentials 610 for users of third-party application 124 (e.g., subscribers of a third-party loyalty account.) In the event the third party does not wish to share actual credentials 610 with the authentication provider, shadow credentials 620 may be used to enable the authentication provider providing the authentication service (e.g., authentication provider 140 of FIG. 1) to securely authenticate the user without the authentication provider learning actual credentials 610 and/or a physical location of the user.

One or more algorithms may be used to generate shadow credentials 620. The one more algorithms may randomly generate shadow credentials 620. For example, the one or more algorithms randomly generate a value and append the randomly generated value with device identification 624.

Shadow credentials 620 may associated with one or more constraints. The one or more constraints may include that shadow credentials 620 do not provide insight into actual credentials 610. For example, shadow credentials 620 including username 626 of BARNEY1234 and password 628 of RUBBLE should not provide insight into actual credentials 610 including username 614 of FLINSTONE and password 616 of FRED. Actual credentials 610 are how the user is known to the third party. The one or more constraints may include that shadow credentials 620 are revealed to authentication provider but actual credentials 610 are not revealed to the authentication provider.

The one or more constraints may include that the third party has the ability to map actual credentials 610 to shadow credentials 620. For example, the third party may know that FRED/FLINSTONE is authenticated using BARNEY/RUBBLE. If the third party is notified that BARNEY/RUBBLE authenticated onto the network, the third party should know that its customer, FRED/FLINSTONE, joined the network.

The one or more constraints may include that the third-party application knows shadow credentials 620 so that the third-party application can provision the connection manager profile on the device. The one or more constraints may include that device identification 624 (e.g., a MAC address) is extractable from shadow credentials 620. For example, if shadow credentials 620 are BARNEY1234/RUBBLE, the authentication provider can determine that that device identification 624 is 1234 and can then compare device identification 624 to the device identification presented in the authentication.

Actual credentials 610 may include one or more of the following: a username 614 and a password 616. Shadow credentials 620 may include one or more of the following: a user identification 622, a device identification 624, a username 626, and a password 628. Username 626 may be an encoding of user identification 622 and device identification 624. For example, user identification 622 and device identification 624 may be concatenated to create username 626. An authentication server (e.g., authentication server 142 of FIG. 1) may know the encoding scheme and may recover user identification 622 and device identification 624 from username 626. If the user has multiple devices 122 such as a phone and a laptop, user identification 622 may be the same for all of the user's devices 122, while device identification 624 may be unique. An example of a unique device identification 624 is the MAC address of device 122.

Table 620 illustrates example shadow credentials 620 for first user Fred Flinstone and second user Barney Rubble. Actual credentials 610 for the third-party application of first user Fred Flinstone include username 614 of FLINSTONE and password 616 of FRED. First user Fred Flinstone is associated with three devices 122: a phone, a tablet, and a laptop. Shadow credentials 620 for first user Fred Flinstone include user identification 622 for all three devices 122, a unique device identification 624 for each device 122, a unique username 626 for each device 122, and a unique password 628 for each device 122.

User identification 622 for first user Fred Flinstone is represented as JETSON for all three devices 122. Device identification 624 for the phone is GEORGE, device identification 624 for the tablet is JUDY, and device identification 624 for the laptop is ELROY. User identification 622 and device identification 624 for each device 122 are concatenated to create username 626 for each device 122. Username 626 for the phone is GEORGEJETSON, username 626 for the tablet is JUDYJETSON, and username 626 for the laptop is ELROYJETSON. Password 628 for the phone is SPACELY, password 628 for the tablet is ASTRO, and password 628 for the laptop is SLATE. Accordingly, if the authentication server receives two authentication requests with username/password credentials GEORGEJETSON/SPACELY and JUDYJETSON/ASTRO, the authentication server knows that the same user has authenticated with two devices 122, although the actual identification of the user is unknown.

Actual credentials 610 for the third-party application of second user Barney Rubble include username 614 of RUBBLE and password 616 of BARNEY. Second user Barney Rubble is associated with two devices 122: phone 1 and phone 2. Shadow credentials 620 for second user Barney Rubble include user identification 622 for both devices 122, a unique device identification 624 for each device 122, a unique username 626 for each device 122, and a unique password 628 for each device 122.

User identification 622 for second user Barney Rubble is represented as MUNSTER for both devices 122. Device identification 624 for phone 1 is HERMAN and device identification 624 for phone 2 is LILY. User identification 622 and device identification 624 for each device 122 are concatenated to create username 626 for each device 122. Username 626 for phone 1 is HERMANMUNSTER and username 626 for phone 2 is LILYMUNSTER. Password 628 for phone 1 is GRANDPA and password 628 for phone 2 is MARILYN. Having a unique device identification 624 and a unique password 628 for each device 122 may prevent unauthorized access.

A third party (e.g., third party 160 of FIG. 1) may autonomously generate shadow credentials 620 using a third-party application (e.g., third party application 124 of FIG. 1). When a user logs into the third-party application, the third-party application may hash username 626 with a key (e.g., a pre-shared algorithm/key), which allows the third-party application running on different devices 122 (e.g., phone, tablet, and laptop) to independently derive the same user identification 622 for a given third-party username 626. Device identification 624 is derived by querying the operating system (OS) of device 122 to determine a unique identifier, such as the MAC address. The derived credentials may then be used to create a connection manager profile (e.g., connection manager profile 126 of FIG. 1.)

The third party may autonomously generate shadow credentials 620 using a third-party authentication server. When the user logs into the third-party application, the third-party authentication server may generate shadow credentials including username 626 and password 628 and securely pass them to the third-party application. The third-party application may then use shadow credentials 620 to create a connection manager profile.

The third party may autonomously generate shadow credentials 620 using a hybrid of the third-party application and the third-party authentication server. When the user logs into the third-party application, the authentication server passes a token, a key, and/or an algorithm to the third-party application. The third-party application may use the token, the key, and/or the algorithm to generate shadow credentials 620.

Modifications, additions, or omissions may be made to table 600 depicted in FIG. 6. For example, user identification may be a randomly generated value. Table 600 may include more, fewer, or other columns, rows, actual credentials 610, usernames 614, passwords 616, devices 122, shadow credentials 620, user identifications 622, device identifications 624, usernames 626, and/or passwords 628. Columns and rows of table 600 may be arranged in any suitable order.

FIG. 7 illustrates an example computer system that may be used by the systems and methods described herein. For example, one or more components of third-party location 120, authentication provider 140, and/or third party 160 of FIG. 1 may include one or more interface(s) 710, processing circuitry 720, memory(ies) 730, and/or other suitable element(s). Interface 710 receives input, sends output, processes the input and/or output, and/or performs other suitable operation. Interface 710 may comprise hardware and/or software.

Processing circuitry 720 performs or manages the operations of the component. Processing circuitry 720 may include hardware and/or software. Examples of a processing circuitry include one or more computers, one or more microprocessors, one or more applications, etc. In certain embodiments, processing circuitry 720 executes logic (e.g., instructions) to perform actions (e.g., operations), such as generating output from input. The logic executed by processing circuitry 720 may be encoded in one or more tangible, non-transitory computer readable media (such as memory 730). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 730 (or memory unit) stores information. Memory 730 may comprise one or more non-transitory, tangible, computer-readable, and/or computer-executable storage media. Examples of memory 730 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   receiving, by a processing system comprising a processor of an authentication server, first credentials from a mobile application installed on a device, wherein the first credentials comprise information associated with the device and information associated with a user of the device;
   automatically receiving, by the processing system and from the device, a request to connect the device to a network of a third party, wherein the request is automatically generated by the device without interaction from the user of the device and without requiring the mobile application to be open, and the request comprises second credentials;
   determining, by the processing system, whether to authenticate the device using the first credentials and the second credentials;
   evaluating, by the processing system, the first credentials to determine whether the first credentials comprise anonymized credentials;

proxying, by the processing system and to equipment of the third party, a response to the request to connect, responsive to the first credentials comprising the anonymized credentials; and communicating, by the processing system, a packet to the device, responsive to the first credentials not comprising anonymized credentials, that allows the device to connect to the network of the third party if the authentication server determines to authenticate the device.

2. The method of claim 1, further comprising:

receiving, by the processing system, a request for notification information from the third party; and communicating, by the processing system, the notification information to the third party, wherein the notification information comprises one or more of the following:

an identification of the user;
a time when the authentication server received the request;
a date when the authentication server received the request;
a location of the device at the time the authentication server received the request;
a result of determining whether to authenticate the device; and
a connection mechanism.

3. The method of claim 1, wherein receiving the first credentials from the mobile application further comprises receiving, by the processing system, the first credentials from an authenticator that received the first credentials from the mobile application installed on the device, and wherein automatically receiving the request to connect the device to the network of the third party further comprises automatically receiving, by the processing system, the request from the authenticator that received the request from the device.

4. The method of claim 1, further comprising:

assigning, by the processing system, an application program interface (API) to the third party, wherein the API allows the third party to perform one or more of the following actions:

add users and credentials;
modify the users and the credentials;
delete the users and the credentials;
turn on system-wide notifications; and
turn off system-wide notifications.

5. The method of claim 1, wherein the device connects to the network of the third party using an authenticator located at a location associated with the third party.

6. The method of claim 1, wherein the information associated with the device further comprises a media access control (MAC) address, and the information associated with the user of the device further comprises a username and a password.

7. The method of claim 1, wherein the anonymized credentials are shadow credentials generated by the third party.

8. An authentication server comprising processing system including a processor and a memory that stores instructions that, when executed by the processing system, facilitate performance of operations, the operations comprising:

receiving first credentials from a mobile application installed on a device, wherein the first credentials comprise information associated with the device and information associated with a user of the device;

automatically receiving, from the device, a request to connect the device to a network of a third party, wherein:

the request is automatically generated by the device without interaction from the user of the device and without requiring the mobile application to be open; and the request comprises second credentials;

determining whether to authenticate the device using the first credentials and the second credentials;

evaluating the first credentials to determine whether the first credentials comprise anonymized credentials;

proxying to equipment of the third party, a response to the request to connect, responsive to the first credentials comprising the anonymized credentials; and communicating a packet to the device, responsive to the first credentials not comprising the anonymized credentials, that allows the device to connect to the network of the third party if the authentication server determines to authenticate the device.

9. The authentication server of claim 8, wherein the operations further comprise:

receiving a request for notification information from the third party; and communicating the notification information to the third party, wherein the notification information comprises one or more of the following:

an identification of the user;
a time when the authentication server received the request;
a date when the authentication server received the request;
a location of the device at the time the authentication server received the request;
a result of determining whether to authenticate the device; and
a connection mechanism.

10. The authentication server of claim 8, wherein receiving the first credentials from the mobile application comprises receiving the first credentials from an authenticator that received the first credentials from the mobile application installed on the device, and wherein automatically receiving the request to connect the device to the network of the third party comprises automatically receiving the request from the authenticator that received the request from the device.

11. The authentication server of claim 8, wherein the operations further comprise:

assigning an application program interface (API) to the third party, wherein the API allows the third party to perform one or more of the following actions:

add users and credentials;
modify the users and the credentials;
delete the users and the credentials;
turn on system-wide notifications; and
turn off system-wide notifications.

12. The authentication server of claim 8, wherein the device connects to the network of the third party using an authenticator located at a location associated with the third party.

13. The authentication server of claim 8, wherein the information associated with the device comprises a media access control (MAC) address, and wherein the information associated with the user of the device comprises a username and a password.

14. The authentication server of claim 8, wherein the first credentials are shadow credentials generated by the third party.

15. One or more non-transitory, machine-readable storage media embodying instructions that, when executed by a processing system including a processor, cause the processing system to perform operations comprising:

receiving, by an authentication server, first credentials from a mobile application installed on a device, wherein the first credentials comprise information associated with the device and information associated with a user of the device;

automatically receiving, by the authentication server and from the device, a request to connect the device to a network of a third party, wherein:

the request is automatically generated by the device without interaction from the user of the device and without requiring the mobile application to be open; and the request comprises second credentials;

determining, by the authentication server, whether to authenticate the device using the first credentials and the second credentials;

evaluating the first credentials to determine whether the first credentials comprise anonymized credentials;

proxying to equipment of the third party, a response to the request to connect, responsive to the first credentials comprising the anonymized credentials; and communicating, by the authentication server, a packet to the device, responsive to the first credentials not comprising the anonymized credentials, that allows the device to connect to the network of the third party if the authentication server determines to authenticate the device.

16. The one or more non-transitory, machine-readable storage media of claim 15, wherein the operations further comprise:

receiving a request for notification information from the third party; and communicating the notification information to the third party, wherein the notification information comprises one or more of the following:

an identification of the user;

a time when the authentication server received the request;

a date when the authentication server received the request;

a location of the device at the time the authentication server received the request;

a result of determining whether to authenticate the device; and a connection mechanism.

17. The one or more non-transitory, machine-readable storage media of claim 15, wherein receiving the first credentials from the mobile application comprises receiving the first credentials from an authenticator that received the first credentials from the mobile application installed on the device, and automatically receiving the request to connect the device to the network of the third party comprises automatically receiving the request from the authenticator that received the request from the device.

18. The one or more non-transitory, machine-readable storage media of claim 15, wherein the operations further comprise:

assigning an application program interface (API) to the third party, wherein the API allows the third party to perform one or more of the following actions:

add users and credentials;

modify the users and the credentials;

delete the users and the credentials;

turn on system-wide notifications; and turn off system-wide notifications.

19. The one or more non-transitory, machine-readable storage media of claim 15, wherein the device connects to the network of the third party using an authenticator located at a location associated with the third party.

20. The one or more non-transitory, machine-readable storage media of claim 15, wherein the information associated with the device comprises a media access control (MAC) address, and the information associated with the user of the device comprises a username and a password.

* * * * *